Jan. 3, 1956   H. E. SIETMAN   2,729,525

PISTON RING

Filed Feb. 9, 1952

Inventor:
Herbert E. Sietman
by Hill, Sherman, Meroni, Gross & Simpson Attys

United States Patent Office 2,729,525
Patented Jan. 3, 1956

2,729,525

PISTON RING

Herbert E. Sietman, Bay Village, Ohio, assignor to Thompson Products, Inc., Cleveland, Ohio, a corporation of Ohio Application February 9, 1952, Serial No. 270,793

6 Claims. (Cl. 309—44)

This invention relates to improvements in piston rings and has among other objects, to provide a simple and improved form of oil control ring made from a plurality of separate superimposed layers of split ring sections.

A further object of my invention is to provide an efficient form of oil control ring which may be inexpensively made from strip steel formed into separate split ring sections superimposed and interlocked to hold the gaps between adjacent ends of the ring sections in staggered relation with respect to each other.

A still further object of my invention is to provide a simple, cheap and efficient oil ring which may readily be made from strip steel and which is so arranged as to eliminate many of the forming stages and manufacturing difficulties heretofore encountered in the manufacture of piston rings from continuous strip stock.

A still further object of my invention is to provide a simple and easily installed oil control piston ring wherein a plurality of scavenger elements are superimposed one on top the other with the slits therebetween in circumferentially spaced relation with respect to each other within the piston, and are interlocked in this position by facing interlocking members connecting the scavenger elements together.

Another and more detailed object of my invention is to improve upon and simplify the oil piston rings in present use by forming the ring from two separate flat split and slit annular ring sections, and interlocking the ring sections by loops formed integrally therewith and extending inwardly from the inner periphery thereof and bent toward the next adjacent ring section, to have interlocking engagement with each other.

These and other objects of my invention will appear from time to time as the following specification proceeds and with reference to the accompanying drawing wherein.

Figure 1:
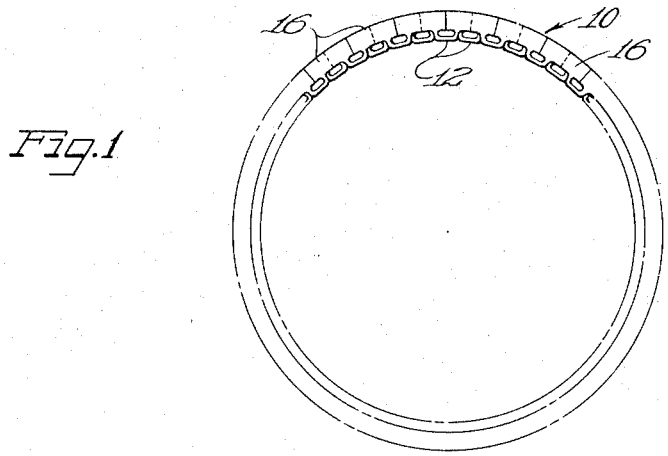
Figure 1 is an enlarged fragmentary plan view of an oil piston ring constructed in accordance with my invention.

In the embodiment of my invention illustrated in the drawing, the reference numeral 10 indicates generally an oil control ring made from a plurality of separate superimposed split ring sections with the gaps of the adjacent ring sections maintained in non-registering relation with respect to each other by inwardly extending interlocking members or loops 12—12 extending inwardly from the inner peripheries of the ring sections and alternately extending from the plane of one ring section along the inner wall of the next adjacent ring section, as will hereinafter more clearly appear as this specification proceeds.

Each split ring section may be made from flat strip steel stock of tool steel, such as S. A. E. 1095 containing 0.95% carbon which may be hardened after the blanking and forming operations and prior to the machining operation.

Figure 2:
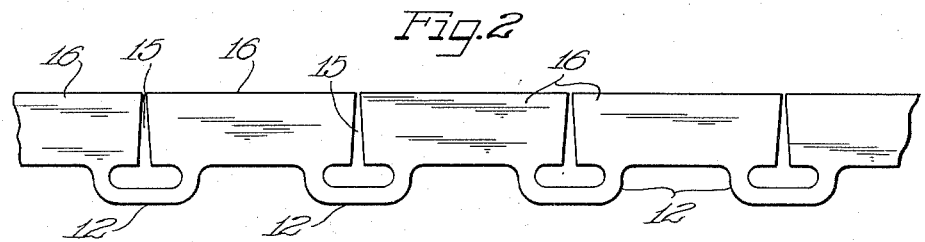
Figure 2 is an enlarged detailed view showing the strip from which the ring is formed after the blanking operation and prior to forming in the form of an annular ring section.
Figure 3:
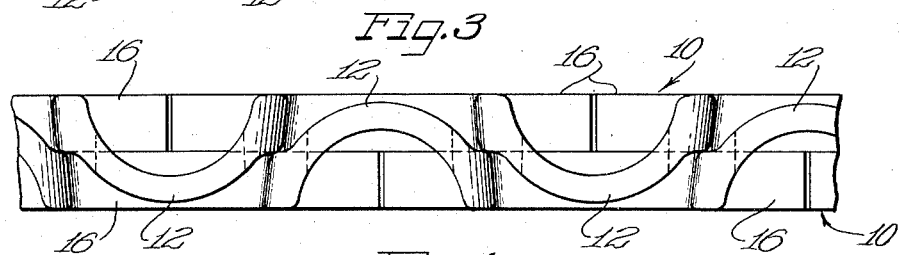
Figure 3 is an enlarged end view of the ring taken from the inside thereof and looking toward the interlocking loops locking the ring sections from movement with respect to each other.

In Figure 2, a blank ring section is shown as having a series of equally spaced slits or cuts 15—15 forming the ring section into a plurality of scavenger elements 16—16 connected together by the interlocking members or loops 12—12, extending from adjacent scavenger elements at points spaced inwardly from the adjacent ends thereof, as shown. The slits 15—15 may initially be rectilinear slits and the edges thereof may be inclined with respect to each other by a rolling or forming operation of the strip, thinning the outer edges thereof, or may be slit or punched to the form shown in Figure 2.

After the blanking operation, the strip ring section may then be formed into an annular form in any well known manner with the loops 12—12 extending inwardly therefrom toward the center of the ring. The loops 12—12 of each ring section may then be formed to the required form to extend to one side of the plane surface of the ring section and to provide interlocking members, adapted to have interlocking engagement with the oppositely extending loops of the next adjacent ring section, as will now be described.

The loops 12—12 may be coined to a reduced cross-section to impart sufficient flexibility thereto to control the radial wall pressure of the ring. Coining may be effected by the punching dies forming the loops, thereby rendering the loops more or less flexible, depending upon the amount the section is reduced. This reduction in cross-section of the loops may be done prior to the operation of forming the ring in ring-like form and during the blanking and punching operations.

After coining the loops and reducing the cross-section thereof the required amount and forming the strip blank into an annular form, the loops of the rings may be punched to extend from the plane surface thereof and along the inner wall of the next adjacent ring when the rings are assembled. The loops of the other ring may be punched in the same manner, and when the rings are assembled, may be inverted so the loops will extend in the spaces between the loops of the next adjacent ring. This lateral punching operation will draw the gaps between the scavenger elements together and will thus close the gaps between adjacent scavenger elements and draw the ring to substantially cylinder bore size for further forming and machining or grinding.

Figure 4:
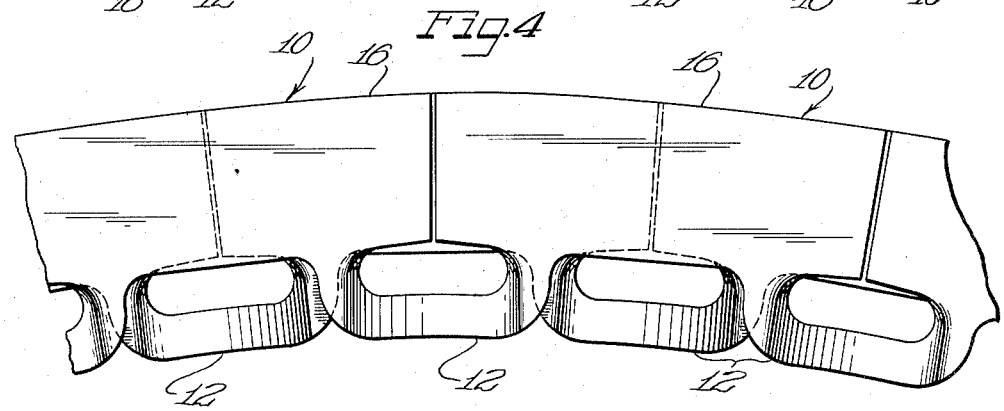
Figure 4 is an enlarged fragmentary plan view of the ring shown in Figure 1.

The alternately arranged depending and upwardly projecting loops 12—12 appear to be of concave and convex forms when looking down on the assembled ring, as in Figure 4, and thus interlock with each other and lock the ring sections from circumferential displacement with respect to each other, with the slits and gaps thereof out of registry with each other.

When inserting the rings in the piston and cylinder of an engine, two mating rings may be selected and placed in abutting and interlocking engagement with respect to each other and then inserted in the piston and cylinder of the engine in the usual manner. When in the piston and cylinder of the engine the radial wall pressure of the ring may be controlled by the flexibility of the coined loops 12—12 and the oil is scavenged from the cylinder wall for return to the crankcase by the slit ring segments or scavenging elements 16—16 conforming to the form of the cylinder and yieldably engaged therewith by the connecting loops 12—12.

It may be seen from the foregoing that an improved oil control piston ring has been provided, consisting in two separable interlocking ring sections, which is of a simple, efficient and durable construction and due to its simplicity and separability is cheaper to manufacture than the oil control rings heretofore in use. It may further be seen that the ring may be formed from flat strip steel stock by a simple punching operation and a subsequent forming operation, forming the ring with a plurality of abutting alternately arranged circumferential scavenging surfaces yieldably engaged with the walls of the cylinder with the required radial wall pressure by the means connecting the scavenging elements together and interlocking the ring sections in staggered relation with respect to each other.

It will be understood that modifications and variations may be effected without departing from the scope of the novel concept of the present invention.

I claim as my invention:

1. A piston ring comprising a plurality of separate flat split superimposed ring sections having facing interlocking members extending inwardly of the inner peripheries thereof and spaced therealong and having interengaging connection with each other for interlocking the ring sections with the gaps of adjacent ring sections in non-registering relation.

2. A piston ring comprising a plurality of flat split superimposed ring sections having spaced facing integrally formed interlocking members extending inwardly of the inner peripheries thereof in spaced relation with respect to each other, the interlocking members of adjacent ring sections alternately extending up and down with respect to the plane surfaces of the associated ring, and having interengagement with each other for interlocking the gaps of adjacent ring sections in non-registering relation.

3. A piston ring comprising a plurality of superimposed flat split annular ring sections radially slit throughout the circumference thereof and providing a plurality of scavenging elements, the slit portions thereof terminating into inwardly extending interlocking members connecting the scavenging elements together and depending from one ring section and extending upwardly from the next adjacent ring section and interlocking the slits and gaps of adjacent ring sections out of registry with respect to each other.

4. A piston ring comprising two superimposed flat split annular ring sections, each ring section being radially slit at regularly spaced intervals throughout the circumference thereof, dividing each ring segment into a plurality of flexible cylinder scavenging elements, means interlocking the scavenging elements of adjacent ring sections out of registry with each other comprising inwardly extending loops of a reduced cross sectional area adjacent their outer extremities, the loops of said ring sections extending laterally from the plane surfaces thereof, and having interengaging connection with each other upon assembly of said ring sections, with the loops of adjacent ring sections facing each other and providing radial cylinder wall pressure for said scavenging elements.

5. In a piston ring, two separate split superimposed ring sections having a plurality of alternately arranged circumferentially spaced radial slits therein dividing the ring sections into a plurality of scavenging elements, integrally formed connecting members connecting said scavenging elements together comprising loops extending inwardly from said scavenging elements from points spaced circumferentially from the adjacent ends thereof, the loops of said ring sections extending from the plane surfaces thereof along the inner peripheral portions of the next adjacent ring section and having interlocking engagement with each other and maintaining the slits and gaps of the ring sections out of registry with each other, and also providing radial wall pressure for the individual scavenging elements.

6. A piston ring comprising two separate superimposed split ring sections having a plurality of circumferentially spaced radial slits therein dividing the ring sections into a plurality of cylinder wall scavenging elements, means connecting said scavenging elements together including a plurality of inwardly extending integrally formed loops extending inwardly from said scavenging elements from points spaced from the adjacent ends thereof, said loops being of reduced cross-sectional area in the region thereof extending across the slit portions of said ring sections, and said loops extending from the plane of one ring beyond the abutting plane of the next adjacent ring and having interengagement with each other and interlocking the gaps between adjacent ends of said ring sections out of registry with each other, and also exerting cylinder wall pressure against the scavenging elements when in the piston and cylinder of an engine.

References Cited in the file of this patent

UNITED STATES PATENTS

| | | |
|---|---|---|
| 2,482,990 | Olson | Sept. 27, 1949 |
| 2,602,715 | Shirk | July 8, 1952 |

FOREIGN PATENTS

| | | |
|---|---|---|
| 643,488 | Great Britain | Sept. 20, 1950 |